(12) United States Patent
Van Der Ploeg

(10) Patent No.: US 11,958,047 B2
(45) Date of Patent: Apr. 16, 2024

(54) ELECTRICALLY HEATED REACTOR AND A PROCESS FOR GAS CONVERSIONS USING SAID REACTOR

(71) Applicant: SHELL OIL COMPANY, Houston, TX (US)

(72) Inventor: Govert Gerardus Pieter Van Der Ploeg, Amsterdam (NL)

(73) Assignee: SHELL USA, INC., Houston, TX (US)

( * ) Notice: Subject to any disclaimer, the term of this patent is extended or adjusted under 35 U.S.C. 154(b) by 569 days.

(21) Appl. No.: 17/252,691

(22) PCT Filed: Jun. 25, 2019

(86) PCT No.: PCT/EP2019/066823
§ 371 (c)(1),
(2) Date: Dec. 15, 2020

(87) PCT Pub. No.: WO2020/002326
PCT Pub. Date: Jan. 2, 2020

(65) Prior Publication Data
US 2021/0113980 A1  Apr. 22, 2021

(30) Foreign Application Priority Data
Jun. 29, 2018 (EP) .................................... 18180849

(51) Int. Cl.
*B01J 8/06* (2006.01)
*C01B 3/38* (2006.01)

(52) U.S. Cl.
CPC .............. *B01J 8/062* (2013.01); *B01J 8/067* (2013.01); *C01B 3/384* (2013.01);
(Continued)

(58) Field of Classification Search
CPC .. B01J 8/062; B01J 8/067; B01J 2208/00415; B01J 2208/00504; B01J 2219/00135;
(Continued)

(56) References Cited

U.S. PATENT DOCUMENTS 6,315,972 B1  11/2001  Mehdizadeh et al.
6,380,525 B2   4/2002  Dalton et al.
(Continued)

FOREIGN PATENT DOCUMENTS

CA        2469859 A1    11/2005
CN     202107542 U      1/2012
(Continued)

OTHER PUBLICATIONS

International Search Report and Written Opinion received for PCT Patent Application No. PCT/EP2019/066823, dated Sep. 20, 2019, 9 pages.
(Continued)

*Primary Examiner* — Huy Tram Nguyen
(74) *Attorney, Agent, or Firm* — SHELL USA, INC.

(57) ABSTRACT

The invention relates to a reactor configuration comprising an electrically heated furnace, with at least one reactor tube placed within the furnace and said reactor tube having an exit and entrance outside of the reactor furnace, and wherein said furnace is further provided with
  at least one electrical radiative heating element suitable for heating to high temperatures located inside said furnace in such a way that the heating element is in no direct contact with the reactor tube; and; and
  a number of inspection ports in the furnace wall such to be able to visually inspect the condition of the reactor tube on each opposite side of said reactor tube during operation, the total number of inspection ports being sufficient to inspect all reactor tubes present in the
(Continued)

furnace at their full length and circumference; and wherein the heating duty of the furnace is at least 3 MW.

12 Claims, 3 Drawing Sheets

(52) U.S. Cl.
CPC ............... *B01J 2208/00415* (2013.01); *B01J 2208/00504* (2013.01); *C01B 2203/0233* (2013.01); *C01B 2203/085* (2013.01); *C01B 2203/1241* (2013.01)

(58) Field of Classification Search
CPC ........... C01B 3/384; C01B 2203/0233; C01B 2203/085; C01B 2203/1241; C01B 2203/0238; C10G 9/24
USPC ........................................................ 422/199
See application file for complete search history.

(56) References Cited

U.S. PATENT DOCUMENTS

| | | |
|---|---|---|
| 6,740,303 B2 | 5/2004 | Boneberg et al. |
| 6,878,471 B1 | 4/2005 | Burch et al. |
| 7,025,875 B2 | 4/2006 | Grieve et al. |
| 7,074,373 B1 | 7/2006 | Warren et al. |
| 7,150,866 B2 | 12/2006 | Wieland et al. |
| 7,160,342 B2 | 1/2007 | Grieve et al. |
| 7,179,325 B2 | 2/2007 | Oyama et al. |
| 7,867,301 B2 | 1/2011 | Agnew et al. |
| 8,303,929 B2 | 11/2012 | Peng et al. |
| 8,614,158 B2 | 12/2013 | Leviness |
| 9,011,560 B2 | 4/2015 | Simmons et al. |
| 9,126,831 B2 | 9/2015 | Kale |
| 9,227,185 B2 | 1/2016 | Mamedov |
| 9,266,731 B2 | 2/2016 | Mass et al. |
| 9,295,961 B2 | 3/2016 | Laska et al. |
| 9,440,851 B2 | 9/2016 | Hwang |
| 9,725,385 B2 | 8/2017 | Steynberg et al. |
| 10,351,422 B2 | 7/2019 | Machhammer et al. |
| 10,589,257 B2 | 3/2020 | Herskowitz et al. |
| 10,676,354 B2 | 6/2020 | Finnerty et al. |
| 2002/0081253 A1 | 6/2002 | Abe |
| 2003/0153632 A1 | 8/2003 | Wang et al. |
| 2004/0083651 A1 | 5/2004 | Kaufman et al. |
| 2005/0223644 A1 | 10/2005 | Kim |
| 2006/0124445 A1 | 6/2006 | Labrecque et al. |
| 2006/0135631 A1 | 6/2006 | Kopponen et al. |
| 2007/0049648 A1 | 3/2007 | Shessel |
| 2007/0084116 A1 | 4/2007 | Ringler et al. |
| 2007/0107308 A1 | 5/2007 | Bonadies et al. |
| 2007/0131909 A1 | 6/2007 | Rojey et al. |
| 2008/0044347 A1 | 2/2008 | Roychoudhury et al. |
| 2008/0260628 A1 | 10/2008 | Moon et al. |
| 2009/0199475 A1 | 8/2009 | Devries et al. |
| 2010/0140552 A1 | 6/2010 | Ammouri et al. |
| 2010/0186824 A1 | 7/2010 | Bowe et al. |
| 2010/0242814 A1 | 9/2010 | Jeney |
| 2010/0327231 A1 | 12/2010 | Whitmore |
| 2011/0079016 A1 | 4/2011 | Etemad et al. |
| 2012/0024843 A1 | 2/2012 | Lissianski et al. |
| 2013/0058861 A1 | 3/2013 | Idem et al. |
| 2013/0197288 A1 | 8/2013 | Schafer et al. |
| 2013/0248768 A1 | 9/2013 | Zachar |
| 2014/0079626 A1 | 3/2014 | Ji et al. |
| 2014/0134101 A1 | 5/2014 | Dem et al. |
| 2014/0369897 A1 | 12/2014 | Verykios et al. |
| 2015/0047252 A1 | 2/2015 | Goerz |
| 2015/0064096 A1 | 3/2015 | Noyes et al. |
| 2015/0125771 A1 | 5/2015 | Finnerty et al. |
| 2015/0308676 A1 | 10/2015 | Lee et al. |
| 2015/0337224 A1 | 11/2015 | Stiegman |
| 2016/0102259 A1 | 4/2016 | Bool et al. |
| 2016/0115036 A1 | 4/2016 | Yoo et al. |
| 2016/0177199 A1 | 6/2016 | Amin et al. |
| 2016/0288074 A1 | 10/2016 | Vogel et al. |
| 2016/0325990 A1 | 11/2016 | Galloway |
| 2017/0106360 A1 | 4/2017 | Meriam |
| 2017/0137284 A1 | 5/2017 | Simmons et al. |
| 2018/0208466 A1 | 7/2018 | Noyes et al. |

FOREIGN PATENT DOCUMENTS

| | | |
|---|---|---|
| CN | 204816461 U | 12/2015 |
| CN | 105754636 A | 7/2016 |
| CN | 205474153 U | 8/2016 |
| CN | 205635499 U | 10/2016 |
| DE | 102014112436 A1 | 3/2016 |
| EP | 0178795 A2 | 4/1986 |
| EP | 2520542 A1 | 11/2012 |
| FR | 2525122 A1 | 10/1983 |
| GB | 124760 A | 6/1920 |
| JP | 2001198904 A | 7/2001 |
| JP | 2007000774 A | 1/2007 |
| JP | 2016153368 A | 8/2016 |
| KR | 20060104718 A | 10/2006 |
| KR | 20110094800 A | 8/2011 |
| WO | 8911448 A1 | 11/1989 |
| WO | 2009011984 A1 | 1/2009 |
| WO | 2013135660 A1 | 9/2013 |
| WO | 2013135666 A1 | 9/2013 |
| WO | 2013135668 A1 | 9/2013 |
| WO | 2013135673 A1 | 9/2013 |
| WO | 2014064648 A2 | 5/2014 |
| WO | 2015189270 A1 | 12/2015 |
| WO | 2015195091 A2 | 12/2015 |
| WO | 2016022090 A1 | 2/2016 |

OTHER PUBLICATIONS

Database WPI Week 201619, 1 page, XP002784612.
Office Action Received for Chinese Application No. 201980040180.7, dated Jan. 5, 2023, 15 Pages (8 Pages of English Translation and 7 Pages of Official Copy).

Tube Appearance

Hot Band     Tiger     Giraffe     Hot Tube

Tube Appearance

ELECTRICALLY HEATED REACTOR AND A PROCESS FOR GAS CONVERSIONS USING SAID REACTOR

CROSS REFERENCE TO RELATED APPLICATION

The present application is the National Stage (§ 371) of International Application No. PCT/EP2019/066823, filed Jun. 25, 2019, which claims priority of European Application Serial No. 18180849.4, filed Jun. 29, 2018, which is incorporated herein by reference in its entirety.

FIELD OF THE INVENTION

The present invention relates to a reactor configuration comprising at least one electrically heated furnace and to a method of performing a gas conversion process at high temperatures, comprising introducing at least one gaseous reactant into said reactor configuration. The reactor and method are useful in many industrial scale high temperature gas conversion and heating technologies.

BACKGROUND OF THE INVENTION

Problems with global warming and the need to reduce the world's carbon footprint are currently high on the political agenda. In fact, solving the global warming problem is regarded as the most important challenge facing mankind in the 21st century. The capacity of the earth system to absorb greenhouse gas emissions is already exhausted, and under the Paris climate agreement, current emissions must be fully stopped until around 2070. To realize these reductions, at least a serious restructuring of industry is needed, away from conventional energy carriers producing $CO_2$. This decarbonization of the energy system requires an energy transition away from conventional fossil fuels such as oil, natural gas, and coal. A timely implementation for the energy transition requires multiple approaches in parallel. For example, energy conservation and improvements in energy efficiency play a role, but also efforts to electrify transportation and industrial processes. After a transitional period, renewable energy production is expected to make up most of the world's energy production, which will for a significant part consist of electricity.

As renewable power costs are already low in certain regions of the world, technologies using electrically heated reactors and installations can be attractive to replace conventional hydrocarbon-fired heated reactors and high duty heating operations. Forecasted power prices and costs of $CO_2$ will increase the economic attractiveness of these reactors even more.

Electricity is the highest grade of energy available. When designing an efficient industrial process, which converts electrical energy into chemical energy, several options can be considered. These options are electrochemistry, cold plasmas, hot plasmas or thermally. In small scale laboratory settings, electrical heating is already being applied for many types of processes. However, when the options are considered for designing chemical (conversion) technologies at an industrial scale, such as gas conversion, each of those options comes with certain complexities and material requirements. This is especially the case when chemical conversion processes are highly endothermic, as the required heat flux and temperature levels are high. In the industry there is a need for electrification technologies that are suitable for endothermic chemical reactions and heating technologies at industrial scale.

US2016288074 describes a furnace for steam reforming a feed stream containing hydrocarbon, preferably methane, having: a combustion chamber, a plurality of reactor tubes arranged in the combustion chamber for accommodating a catalyst and for passing the feed stream through the reactor tubes, and at least one burner which is configured to burn a combustion fuel in the combustion chamber to heat the reactor tubes. In addition, at least one voltage source is provided which is connected to the plurality of reactor tubes in such a manner that in each case an electric current which heats the reactor tubes to heat the feedstock is generable in the reactor tubes.

US2017106360 describes how endothermic reactions may be controlled in a truly isothermal fashion with external heat input applied directly to the solid catalyst surface itself and not by an indirect means external to the actual catalytic material. This heat source can be supplied uniformly and isothermally to the catalyst active sites solely by conduction using electrical resistance heating of the catalytic material itself or by an electrical resistance heating element with the active catalytic material coating directly on the surface. By employing only conduction as the mode of heat transfer to the catalytic sites, the non-uniform modes of radiation and convection are avoided permitting a uniform isothermal chemical reaction to take place.

The prior art approaches have their unique challenges, capabilities and/or are based on combining combustion heating with linear electrical heating. Therefore, there is still a need for more and other options for electrical heating technology that can for example be applied for large scale chemical reactions.

The present disclosure provides a solution to said need. This disclosure relates to electrified gas conversion technologies at industrial scale, achieving high process efficiencies, and being relatively simple with low overall cost.

SUMMARY OF THE INVENTION

Accordingly, the present disclosure relates to a reactor configuration comprising at least one electrically heated furnace which defines a space, with at least one reactor tube placed within the furnace space and said reactor tube having an exit and entrance outside of the reactor furnace, and wherein said furnace is further provided with
- at least one electrical radiative heating element suitable for heating (the heating element) to high temperatures in the range of 400 to 1400° C., said heating element being located inside said furnace in such a way that the heating element is in no direct contact with the at least one reactor tube; and; and
- a number of inspection ports in the furnace wall such to be able to visually inspect the condition of the at least one reactor tube on all sides of said reactor tube during operation, the total number of inspection ports being sufficient to inspect all reactor tubes present in the furnace at their full length and circumference; and wherein the heating duty of the furnace is at least 3 MW.

The process being electrically heated demands a heat-flux and temperature profile. In many applications the heat-flux is larger when the process flow enters the furnace whilst having a lower temperature. Towards the exit the heat-flux is lower whilst having higher temperature. The present invention can accommodate this requirement.

Further, the present disclosure relates to a method of performing a gas conversion process at high temperatures, comprising introducing at least one gaseous reactant into the above described reactor configuration, electrically heating the at least one heating element to a temperature in the range of 400-1400° C., preferably from 500 to 1200° C., even more preferred from 600 to 1100° C., and performing the high temperature gas conversion while (regularly) inspecting the reactor tube(s) through the inspection ports.

DETAILED DESCRIPTION OF THE DISCLOSURE

Several heating options may be considered for replacing industrial scale gas-fired heating by electrical heating.

According to the present disclosure, the reactor configuration comprises electrical radiative heating elements for heating the reactor tube. So, electrically generated heat is predominantly transferred by means of radiation.

The term reactor configuration as used herein should be understood to comprise any industrial installation suitable for industrial scale reactions and process heating, and, accordingly, the term reactor tube should be understood to comprise any vessel in which (a) substance(s) is (are) heated to high temperature.

Radiative heating is described by Stefan-Boltzmann's law for radiation. First principle calculations based on Stefan-Boltzmann's law suggest that a heating element temperature of 1065° C. is required to transfer 120 kW·m$^{-2}$ of heat energy to a reactor tube at 950° C. However, the actual heat transfer mechanism is much more complicated, as not only direct radiation applies. This is schematically shown in FIG. 1. First there is direct radiation from the heating elements to the reactor tubes. A second radiating body is the hot face wall of the furnace. In turn, the hot face wall is heated by radiation from the electrical heating elements. The third heat transfer mechanism occurs by means of (natural) convection. Gases in the furnace rise near the heating elements and drop near the reactor tube. The fourth heat transfer mechanism occurs through radiation of the heated gases in the furnace. The relatively small contribution thereof depends on the selected gaseous atmosphere.

Several options for providing electrical heat to a process are available and can be considered according to the present disclosure. For example, more challenging processes having two-phase flow and/or coking service.

It has now been found that a particularly suitable way of electrical radiative heating can be provided when the at least one radiative heating element is a resistance based heating element. Electric resistance heating is a well-known method of converting electrical power into heat. This technology is used in many other industrial applications. High temperature (>1000° C.) resistance heating is, for example, used in the glass industry, metal industry and many laboratory installations. When considering an isolated system, converting power to heat by means of resistance heating, is near 100% efficient. Resistance heating takes place by means of the "Joule effect". Joule's first law states that the power of heating generated by an electrical conductor is proportional to the product of its resistance and the square of the current (I2R, wherein I is the current and R is the resistance).

Many different types of electrical resistance heating elements exist, each having their specific application purpose. For the present application, reasonably high temperatures must be achieved for which several technologies are available. As an example, mineral insulated wire technology may be used for certain applications, however use thereof is limited. In the present reactor configuration advantageously at least one electrical heating element comprises NiCr, SiC, MoSi$_2$ or FeCrAl based resistance heating elements.

Nickel-chromium (NiCr) heating elements are used in many industrial furnaces and electric household appliances. The material is robust and repairable (weldable), available at medium costs and in various grades. However, the use of NiCr is limited by a maximum operating temperature at ~1100° C., considering the lifetime of the heating elements.

Another option for use in the reactor configuration and the high temperature application of the present disclosure are silicium carbide (SiC) heating elements. SiC heating elements can achieve temperatures up to ~1600° C. and may have large diameters (commercially available up to 55 mm) allowing a high heating duty per element. In addition, the costs of SiC heating elements are relatively low.

A preferred embodiment of the electrical heating element in the reactor configuration of this disclosure comprises MoSi$_2$ or FeCrAl based resistance heating elements.

Molybdenum disilicide (MoSi$_2$) elements have the ability to withstand oxidation at high temperatures. This is due to the formation of a thin layer of quartz glass on the surface. A slightly oxidizing atmosphere (>200 ppm O$_2$) is needed to maintain the protective layer on the elements. At temperatures ~1200° C. the material becomes ductile while being brittle below this temperature. After having been in operation the elements become very brittle in cold conditions and thus are easily damaged. The MoSi$_2$ heating elements are available in various grades. The highest grade can operate at 1850° C., allowing use in a large range of high temperature gas conversion processes. The electric resistivity of the elements is a function of temperature. However, the resistance of these elements does not change due to aging. Only a slight reduction in resistance occurs during the first use period. Consequently, failed elements can be replaced without having impact on the other connected elements when installed in series. An advantage of MoSi$_2$ elements is the high surface loading of up to 35 W·cm$^{-2}$.

The most preferred electrical heating element in this disclosure is FeCrAl (Fecralloy). FeCrAl resistance wire is a robust heating technology. The duty can be controlled by means of relatively 'simple' on/off control. Theoretically, high voltages can be applied to deliver the heating duty. However, this is not commonly applied as it puts extra load on the electrical switches and requires suitable refractory material to provide sufficient electrical insulation. Fecralloy heating elements have favorable lifetime and performance properties. It is capable of operating at relatively high temperature (up to ~1300° C.) and has a good surface load (~5 W·cm$^{-2}$). Preferably, Fecralloy heating elements are used in an oxidizing atmosphere (>200 ppm O$_2$) to maintain an Al$_2$O$_3$ protective layer on the elements.

The heating elements can have different kinds of appearances and forms, like round wires, flat wires, twisted wires, strips, rods, rod over band, etc. The person skilled in the art will readily understand that the form and appearance of the heating elements is not particularly limited and as (s)he will be familiar with selecting the proper dimensions, this is not further discussed here in detail.

The highest temperature that can be achieved in the reactor configuration of the present disclosure is mainly limited by the type of heating elements that is used. For the reactions for which the present reactor configuration is made the temperature is 400 to 1400° C., preferably from 500 to 1200° C., even more preferred from 600 to 1100° C.

A conventional gas conversion reactor, like for example, but not limited to, a steam methane reformer (SMR), uses gas fired burners to supply the endothermic heat energy required to perform the endothermic gas conversion reaction. Multiple burner reactor configurations exist such as top, bottom and side fired. Supplying heat by means of electrical heating comes closest to a side fired burner configuration. The side fired configuration is in general the most desirable configuration as the heat-flux to the reactor tubes can be controlled more evenly over the reactor tube length. However, this side fired burner configuration is not widely applied in practice as it has several disadvantages. In case of gas-fired heating, the side fired configuration requires many burners and the heat flux control results in an increased complexity of the combustion control. The heat flux herein is defined as the flow of energy per unit of area per unit of time (in SI its units are watts per square meter ($W/m^2$)).

When using electrical heating, the above-mentioned disadvantages of side gas-fired heating are no longer present and the process advantages of having a more accurate duty control over the length of the reactor tube can be accomplished. For example, higher outlet temperatures can be achieved, thereby improving conversion. The size of the furnace is a result of the specified reactor tube heat flux and surface load of the heating elements ($W/m^2$), in combination with the required temperatures for radiative heat-transfer.

The reactor configuration according to the present disclosure can be scaled up to the required industrial scale. The sizes of conventional reactor tubes used in industrial scale gas-conversion reactors are in the order of 120-140 mm outside diameter and 12 meter length. Notwithstanding that many different process tube configurations may be applied to suit the need of the process. For electrical heating, given the increased controllability of heat fluxes and temperature optimization of the reactor tube configuration can be expected. i.e. resulting in a more compact design. Thus, suitably, in the present reactor configuration the size of a reactor tube is at least similar to the conventional reactor tube size. For many industrial gas conversion reactions, preferably, the reactor configuration comprises at least one reactor furnace comprising ten or more reactor tubes, suitably of the conventional size. It is desirable to have as many reactor tubes enclosed in one furnace as practically possible. The number of heating elements depends on the required heat flux, the required temperatures, the material properties of the reactor tubes and the material properties of the heating elements, and the size thereof. The heating elements are placed along the reactor tubes in such a way that the reactor tubes are heated essentially over the full length, only excluding the inlet and outlet as required. Suitably, the number of heating elements in the reactor configuration of this disclosure is ten or more.

When in operation, a differentiated heat flux and temperature profile develops over the height/length of the furnace. To control the temperatures in different sections of the furnace and to achieve a heat flux profile over the surface of the reactor tube(s), the furnace preferably comprises of at least two heating zones along the height/length of the furnace, wherein each heating zone has its own power control unit. This allows to modify the heat fluxes in the different heating zones, wherein each of the zones can have a different heat flux. Especially, the reactor furnace in the present reactor configuration comprises at least four heating zones (see e.g. FIG. 3). In particular, the reactor furnace in the present reactor configuration comprises as many heating zones as practically possible to allow a fully controlled heat flux and temperature profile. In a preferred embodiment, the present reactor configuration comprises at least twelve heating zones.

The reactor configuration according to the present disclosure comprises at least one reactor furnace. To obtain the total reactor unit capacity a multitude of reactor furnaces may be applied. The number depends on factors like the required reactor volume, the size of the furnace, the number of reactor tubes, etcetera. The type of furnace may be selected as appropriate, and heating arrangements therein may be selected as appropriate, such as using dividing walls and heating columns. A preferred furnace design for use according to the present disclosure is a chamber furnace, which allows most efficient use of space on industrial scale.

The heating duty is defined as: the product of the heat flux ($\Phi_q$) on the surface and the (relevant) receiving surface area (A). For example, the heating duty of a furnace with a heat flux of $\Phi_q=120$ kW/$m^2$ and a receiving area of A=30 $m^2$ is 3.6 MW. The heating duty of the furnace of the reactor configuration of the present disclosure is at least 3 megawatts (MW). In the reactor configuration of the present disclosure the relevant receiving surface area is the surface area of the reactor tube (or vessel). The preferred heating duty is at least 10 MW, and more preferably at least 30 MW. At industrial scale the heating duty can be as high as multiple gigawatts (GW), e.g. 5 or 10 GW, in total, requiring multiple furnace units each having a heating duty of for example 500 MW.

The reactor configuration according to the present disclosure is provided with inspection ports in the furnace wall such to be able to visually inspect the condition of the at least one reactor tube on all sides of said reactor tube during operation, the total number of inspection ports being sufficient to inspect all reactor tubes present in the furnace at their full length and circumference. This is preferably achieved by using infrared radiant measurement techniques (e.g. pyrometer) from which hot spots can be made more accurately visible. Such ports are configured as a small open path through the wall of the furnace. Each such opening is provided with a hatch which closes the port in case it is not used.

In a preferred embodiment of the present disclosure the reactor configuration comprises a combination of some or all different preferred features. Accordingly, the reactor configuration preferably comprises at least ten electrically heated furnaces, each of which defines a space, and within each space at least ten reactor tubes, each of said reactor tubes having an exit and entrance outside of the reactor furnace, each of said furnaces further being provided with ten or more electrical radiative heating elements suitable for heating to high temperatures in the range of 400 to 1400° C., arranged in at least four heating zones, wherein each heating zone has its own power control unit; and a number of inspection ports in the furnace wall such to be able to visually inspect the condition of the at least one reactor tube on each opposite side of said reactor tube during operation with the use of infrared radiant measurement techniques (e.g. pyrometer), the total number of inspection ports being sufficient to inspect all reactor tubes present in the furnace at their full length and circumference; and wherein the heating duty of the furnace is at least 30 MW.

The reactor configuration according to the present disclosure enables cost effective large-scale integration of renewable power into industrial scale chemical conversion reactions and other industrial heating technologies, for example into gas conversion technologies and crude distillation, and may result in a significant reduction of $CO_2$ production, and even $CO_2$ consumption. In a preferred embodiment, the reactor configuration according to this disclosure is provided with a power supply connection to a renewable source for supplying at least part of the required power for the electrical heating.

For example, the reactor may be applied as an electrically heated steam methane reforming process unit for the production of hydrogen, as is used in Gas-To-Liquid (GTL) technologies. The Steam Methane Reforming (SMR) process requires a heat flux of ~120 kW/m2 (range 70-140 kW/m2) to provide the heat energy for the endothermic reaction taking place at a temperature level of about 600 to about 1100° C., the upper limit being governed by the maximum temperature which the metal of the reactor tubes can withstand. In FIG. 2 the schematics for conventional gas-fired SMR/HMU (Steam Methane Reformer/Hydrogen Manufacturing Unit) is shown.

Therefore, the present disclosure also relates to a method of performing a gas conversion process at high temperatures, comprising introducing at least one gaseous reactant into a reactor configuration as described above, electrically heating the at least one heating element to a temperature in the range of 400-1400° C., preferably from 500 to 1200° C., even more preferred from 600 to 1100° C., and performing the high temperature gas conversion while (regularly) inspecting the reactor tube by means of sight on the reactor tube. The temperature depends on the required temperature for the chemical conversion reaction and the type of heating elements used.

Preferably, the method comprises controlling the temperatures/heat fluxes in different sections of the reactor furnace, wherein the reactor furnace comprises at least two heating zones, wherein each heating zone has its own power control unit that is regulated to achieve a heat flux profile over the surface of the at least one reactor tube.

In a preferred embodiment, the process and reactor configuration of the present disclosure are used for producing a synthesis gas by means of steam methane reforming, dry $CO_2$ reforming, reverse water-gas shift or a combination thereof. Accordingly, a preferred method is performing a gas conversion process comprising producing a synthesis gas by means of steam methane reforming, dry $CO_2$ reforming, reverse water-gas shift or a combination thereof, comprising the steps of:
i. Providing hydrocarbons and steam and/or $CO_2$ to the reactor configuration, such that the reaction mixture enters the at least one reactor tube;
ii. Maintaining the furnace of the reactor at a temperature of at least 400° C. by providing electrical energy to the at least one heating element;
iii. Allowing the hydrocarbons and steam to be converted into hydrogen and carbon monoxide; and
iv. Obtaining from the reactor a synthesis gas stream.

The conversion in step iii is for example followed by sample analysis by gas chromatography and/or by monitoring the temperature changes at the exit of the reactor tube.

The term hydrocarbons herein above encompasses for example treated methane, being treated fossil natural gas (preferred), or bio-methane purified from non-hydrocarbon impurities. Methane from fossil natural gas is a hydrocarbon gas mixture consisting primarily of methane (i.e. at least 80%), but commonly including varying amounts of other higher alkanes and sometimes a small percentage of nitrogen, hydrogen sulfide, carbon dioxide, Argon or helium. Treated methane is the preferred hydrocarbon, however, also other hydrocarbons, preferably treated hydrocarbons, and preferably being C2-C6 hydrocarbons, such as ethane and propane, and mixtures of hydrocarbons can be used as reactants for the process.

The methane reforming process can be done with either steam, $CO_2$ or any combination thereof. The syngas produced by methane reforming using steam has a $H_2:CO$ ratio which is too high for Fischer Tropsch conversions. In a preferred embodiment, this $H_2:CO$ ratio can be lowered by co-introducing $CO_2$, resulting in a semi-dry methane reforming process. The produced syngas $H_2:CO$ ratio matches the required ratio to perform Fischer Tropsch conversion. While using the reactor configuration of the present disclosure, also only $CO_2$ and methane can be fed in a dry-reforming process to produce a $H_2:CO$ ratio of 1.

When using electrical power to heat this endothermic process relates to the so-called Power-To-Liquid (PTL) process instead of Gas-To-Liquid (GTL).

Reverse Water Gas Shift (RWGS) is a high temperature moderately endothermic process. RWGS becomes valuable when $CO_2$ is used as carbon source instead of methane or a combination of methane and $CO_2$. Also, this gas conversion reaction is an example of a reaction that can suitably be performed in the reactor configuration of the present disclosure.

The reactor configuration and method according to the present disclosure have broad application possibilities. As high temperature gas conversions and process heating are widely applied in chemical industry, the present disclosure provides numerous opportunities for use in petrochemical or chemical application. As the heat flux and temperature levels that can be achieved are amongst the most severe, any kind of (gas-)fired equipment can be replaced with electrical radiative heat generation, such as crude furnaces, distillation preheat furnaces, hot-oil furnaces, many chemical gas conversion reactors, for example, but not limited to, steam cracking with several feeds, several (steam) reforming reactions, hydroprocessing reactions, etcetera. Steam cracking herein is defined as the thermal cracking of hydrocarbons in the presence of steam to produce high value chemicals such as hydrogen, ethylene, propylene, butadiene, benzene, toluene and xylene. Regarding the steam cracking of hydrocarbons, it is noted that the pyrolysis reaction of hydrocarbons follows a free radical mechanism, requiring high temperatures. Steam acts as a diluent; its main role is to reduce the partial pressure of hydrocarbons, which improves selectivity by promoting higher yields of lower olefins. Potential steam cracker feeds cover almost the entire crude oil boiling range including the following: Ethane, Propane, Butane, Dry Gas, Coker Gas, Naphtha, Kerosene, Gas Oil, Vacuum Gas Oil, Hydrowax, Base Oil, Crude and Condensate. The person skilled in the art will readily understand that the range of possible chemical reactions for application of the reactor is not particularly limited as long as high temperature gas conversion reactions are to be achieved or high temperature process heating is required such as in crude furnaces.

DESCRIPTION OF THE DRAWINGS

FIG. 4. Various typical overheated reactor tube appearances, from left to right: "hot band", "tiger tailing", "giraffe necking", "hot tube".

Hereinafter the invention will be further illustrated by the following non-limiting examples.

EXAMPLES

Example 1

100 MW Furnace Design

A conceptual electrical furnace design for SMR was made based with 26 furnace units each having a power of a ≈4 MW. Through optimization of the distance between the reactor tubes and arrangement of the heating elements, applying rod over band heating arrangements, a uniform power distribution and temperature is achieved on each reactor tube. The size of the furnace is a result of the specified reactor tube heat flux and surface load of the heating elements (kW/m2), in combination with the required temperatures for radiative heat-transfer.

Each furnace unit contains four vertically stacked segments each having a design power duty of 1.26 MW translating to 110 kW·m$^{-2}$ on reactor tube surface. The total design furnace duty of 131 MW allows for load shifting in the furnace in case heating elements fail. Within each of the four segments again three heating zones of one meter high are placed. Each of these heating zones consists of six heating elements of 70 kW @ 345 V (FeCrAl). This brings the number of heating zones in the entire furnace unit to twelve heating zones.

Furnace viewports (inspection ports) at different levels are designed at each side of the furnace to inspect the condition of the reactor tubes.

The weight of a single furnace unit is in the range of ~10-50 ton. The total furnace plot space is estimated at 50×17.5 m=875 m$^2$ excluding plot space for the electrical infrastructure.

The insulation material used on the internal surface of the furnace in the conceptual furnace design is a material that is conventionally used in this type of applications.

Furnace Control

Figure 1:
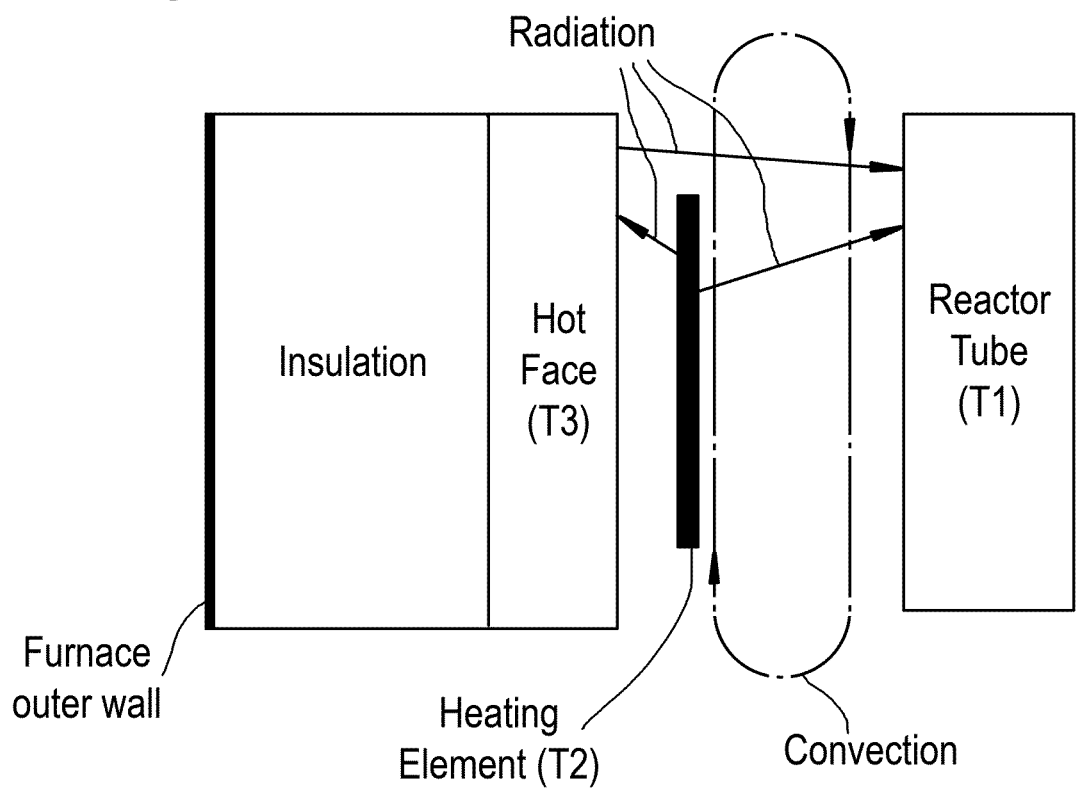
FIG. 1. Schematic overview of heat transfer mechanisms in resistance heating.
Figure 2:
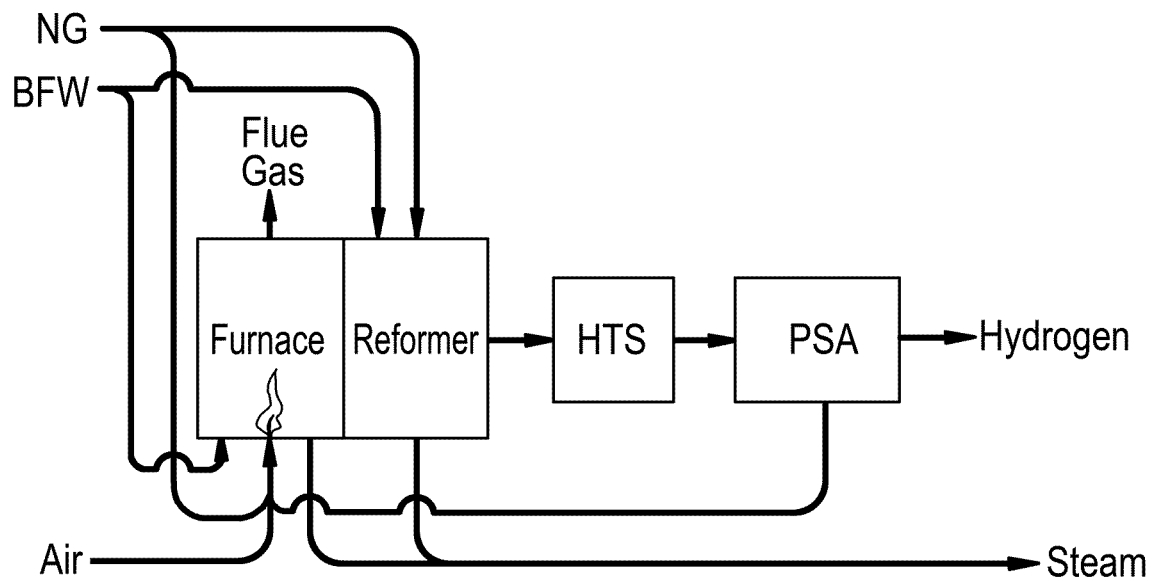
FIG. 2. Schematic representation for a conventional gas-fired heated Steam Methane Reforming & Hydrogen Manufacturing unit. NG is Natural Gas; BFW is Boiler Feed Water; HTS is High Temperature Shift; PSA is Pressure Swing Adsorption.
Figure 3:
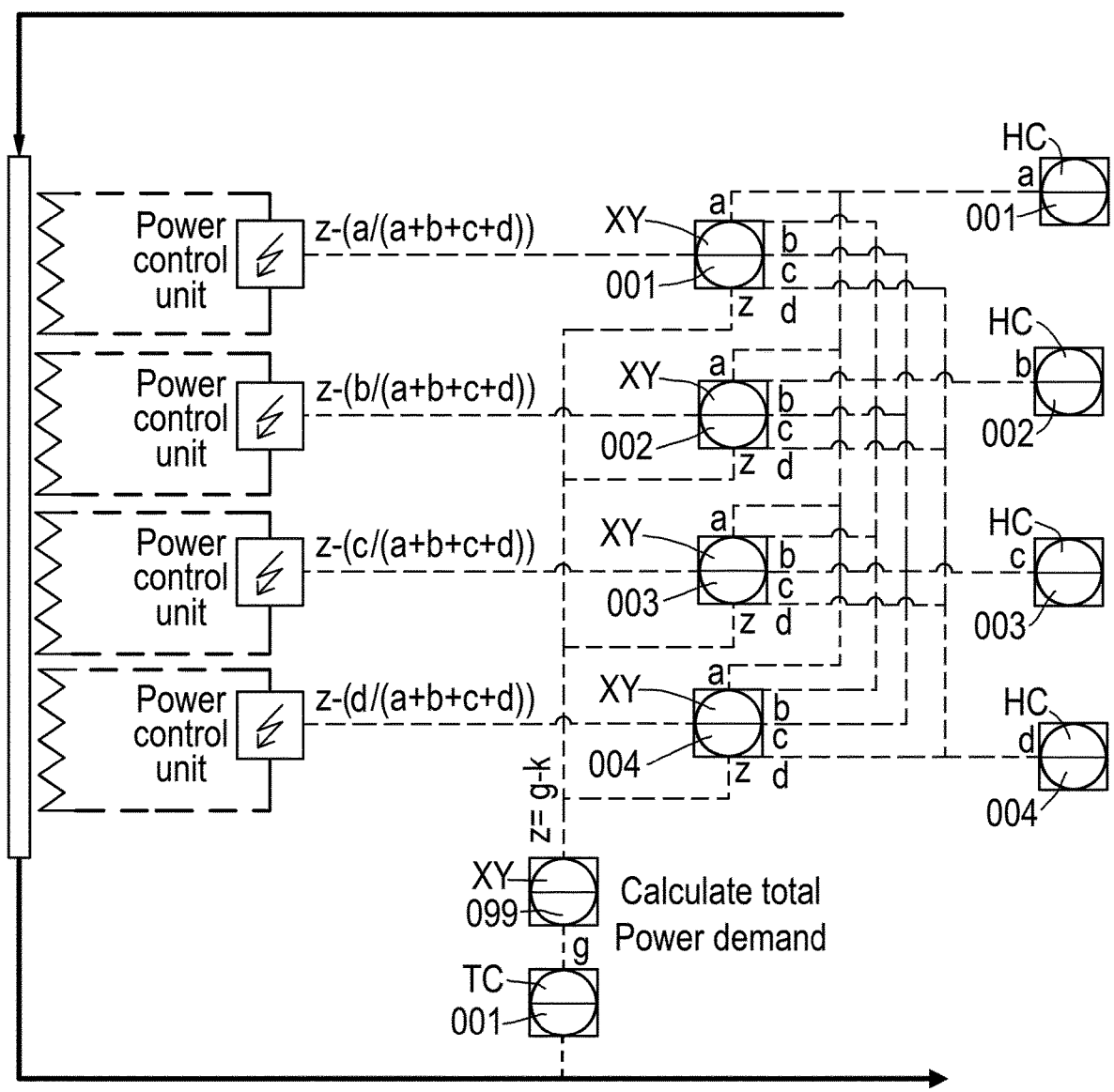
FIG. 3. Schematic representation of the furnace control in a reactor configuration according to the present disclosure with four heating zones, in the drawing represented by coils, each connected with a separate power control unit. The reactor is represented here by a narrow vertical rectangular unit depicted on the left of the drawing, which in reality may also be for example a U-bent unit, or a horizontal unit. Arrows indicate the reactant feed and product exit streams, respectively. TC-001 is the reactor outlet temperature control, XY-099 converts the TC output to desired power, in the formula z=g·k, g is the percentage output of the temperature control (i.e. TC-001), k represents the constant to convert from controller output to desired furnace duty (for example 100 MW/100%→1 MW/%). In dividing the requested duty over the electrical furnace, each heating zone has a hand controller (HC-001 to HC-004). From the output of these hand controllers, the fraction is multiplied with the afore mentioned total requested duty z in calculation blocks XY-001 to XY-004. This required power is subsequently send to the power control unit of the specific heating zone.

Furnace control takes place as shown in FIG. 3. A heat flux/temperature profile is set by means of hand controllers over the length of the furnace. The highest heat flux occurs at the top of the reactor tube where both the further heating to required reaction conditions of the reaction mixture occurs and reactions start to consume heat energy. A peak is reached in heat flux after which this declines while the temperature increases. The highest temperature combined with lowest heat flux occurs at the outlet. Here chemical equilibrium is virtually achieved at the desired final temperature. To fit this profile, four heating zones have been designed. Each zone delivers a pre-defined fraction of the total demanded duty. This will consequently lead to a heating element-reactor tube temperature equilibrium according to radiative heat transfer principles as described before (vide supra).

Electrical Infrastructure

The design electrical power consumption of the "100 MW furnace", including 10% design margin=117 MWe. The design premise is to start with a 132 kV AC bus and, through transformers, reduce the voltage level to the desired 690 V. The concept is to use 6×132/11 kV Transformers and 47×11/0.72 kV Transformers. From a design perspective, the large grid transformers would likely be located remote from the electrical furnace since the incoming power may be via overhead lines to an outdoor substation.

To achieve the $CO_2$ emission reductions, the power is expected to come from renewable generation capacity, but waste stream power sources may also be used in an integrated process set-up.

Example 2

Reactor Configuration with a Furnace According to Example 1 in Operation

Start-Up

In comparison to a conventional SMR, electrical furnaces can be started gradually. The turndown ratio for electrical heating is virtually unlimited and consequently start-up is well controllable. Moreover, the heat distribution is uniform across all tubes. This is contrary to conventional hydrocarbon-fired SMRs where a few burners may be lit resulting in a temporary unbalance. To prevent damage to the electrical heating elements the heat-up rate should be limited.

Shutdown

To prevent damage to the reactor tubes a maximum cool down rate of 50° C.·hr$^{-1}$ must be adhered to. Considering that the turndown capability is very high and provided that the electrical heating system is functioning normally, this cooldown rate limitation can be adhered to. Moreover, in trip scenarios (i.e. unexpected stopping of the process, for example, when a fire occurs) the settle-out temperature, considering all heat capacity in the heating elements and refractory must be calculated. It is expected that this temperature is sufficiently low to prevent a reactor tube bursting. Moreover, steam purge, and reactor depressurization is part of normal shut-down procedures.

Turndown

Conventional SMR furnaces have a turndown ratio of ~5 (turndown=design throughput/minimum throughput). This is predominantly governed by the ability of the furnace burners and fuel characteristics. Instead, electrically powered furnaces have a virtually unlimited turndown ratio. New limitations for the turndown are caused by the limitations on the process side, such as flow distributions over the reactor tubes.

Trip

To prevent power grid instability in the event of the load rejection associated with tripping the 100 MWe duty not associated with an electrical fault, a delay may be implemented to allow the electrical grid to adjust to the power rejection, so that the load is not all rejected in one step. Such a delay is in the order of seconds to a few minutes. Future development should identify the exact strategy by grid stability assessment. From a process point of view, such delays can be accommodated. When a trip occurs, steam is injected and the process is depressurized.

Trouble Shooting

Figure 4A:
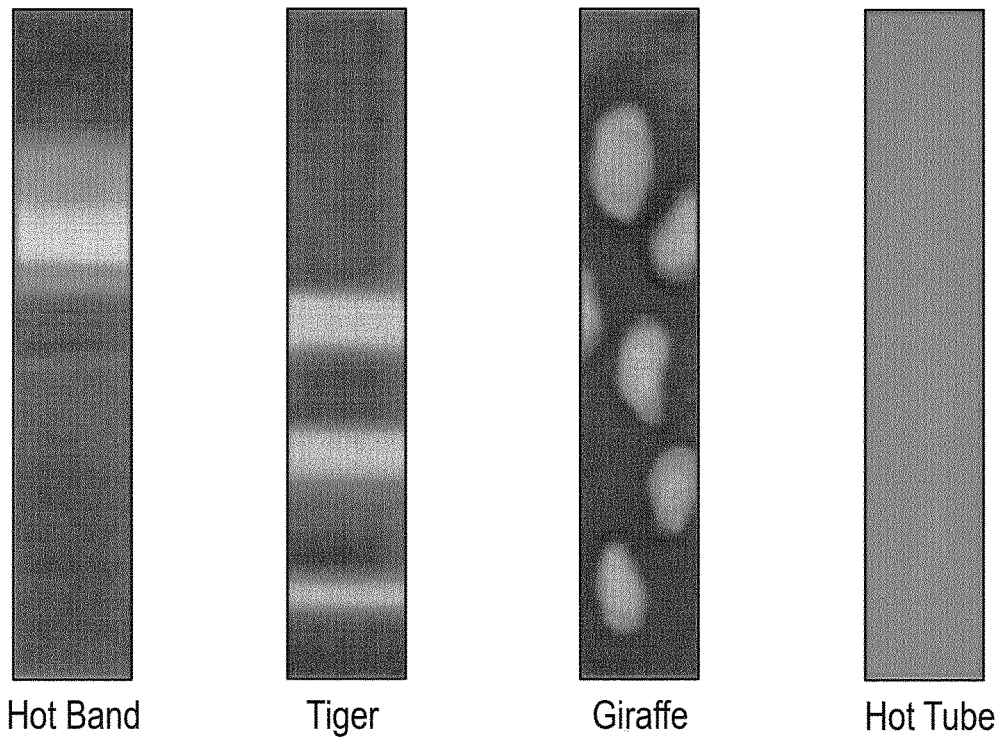
FIG. 4a: drawing showing actual color shadings of overheated reactor tube appearances
Figure 4B:
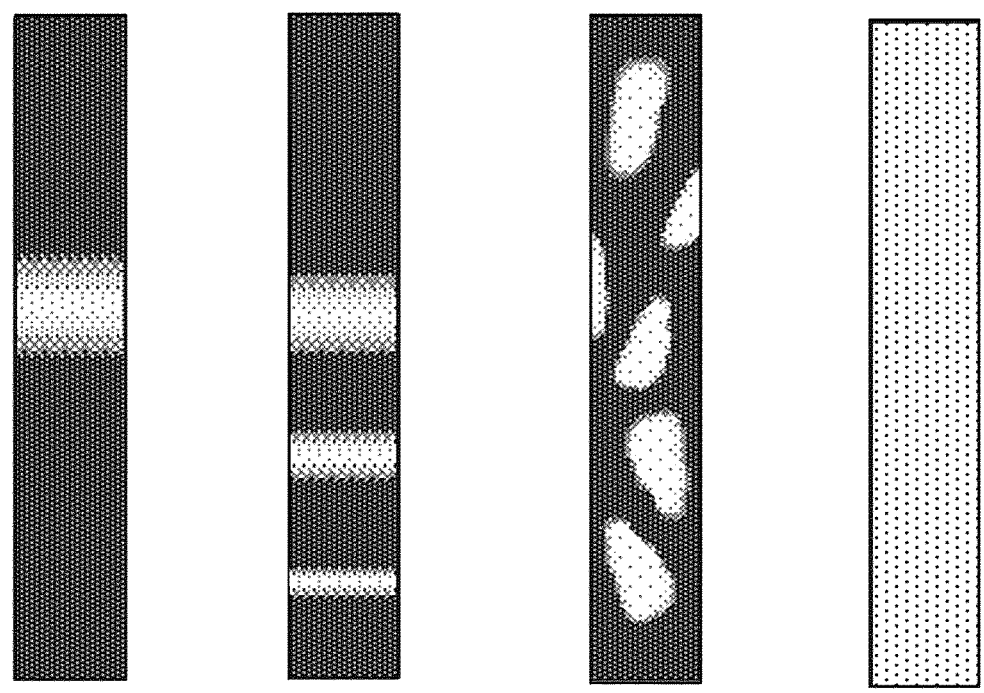
FIG. 4b: schematic representation of the same.

For various reasons, the reactor tubes can become overheated. For example, localized catalyst activity loss can occur, carbon formation resulting in a plugged reactor tube or voids can be present due to wrong catalyst loading. Various typical overheated reactor tube appearances can result as depicted in FIG. 4. According to the present disclosure, it is possible to monitor the reactor tubes during operation. Inspection ports have been designed in the electrical furnace to be able to inspect the reactor tubes during operation. Normally this is assessed using infrared radiant measurement techniques (e.g. pyrometer).

Example 3

Data for a 3 MW electrical capacity SMR hydrogen manufacturing unit when compared to a conventional hydrocarbon-fired unit:

|  |  | Electrically heated | Conventional hydrocarbon fired |
|---|---|---|---|
| Total hydrogen production | kmol/h | 118.27 | 118.27 |
| Total hydrogen production | ton/day | 5.72 | 5.72 |
| Steam/Carbon SMR Feed |  | 3.20 | 3.20 |
| Natural gas intake | ton/day | 11.60 | 19.33 |
| $CO_2$ emissions | ton/day | 31.55 | 52.84 |
| Overall efficiency (incl. steam export) |  | 88% | 82% |
| Overall efficiency (excl. steam export) |  | 88% | 74% |
| SMR furnace (electrical) heating duty | MW | 3.00 | 2.44 |
| SMR furnace process temperature | ° C. | 860 | 860 |
| Steam production | ton/day | 63.12 | 92.84 |

That which is claimed is:

1. A reactor configuration comprising at least one electrically heated furnace which defines a space, with at least one reactor tube placed within the furnace space and said reactor tube having an exit and entrance outside of the reactor furnace, and wherein said furnace is further provided with
   at least one electrical radiative heating element suitable for heating to high temperatures in the range of 400 to 1400° C., said heating element being located inside said furnace in such a way that the heating element is in no direct contact with the at least one reactor tube; and
   a number of inspection ports in the furnace wall such to be able to visually inspect the condition of the at least one reactor tube on all sides of said reactor tube during operation, the total number of inspection ports being sufficient to inspect all reactor tubes present in the furnace at their full length and circumference; and
   wherein the heating duty of the furnace is at least 3 MW.

2. The reactor configuration according to claim 1, wherein the at least one radiative heating element is a resistance based heating element.

3. The reactor configuration according to claim 1, wherein the at least one electrical heating element comprises NiCr, SiC, MoSi2 or FeCrAl based resistance heating elements.

4. The reactor configuration according to claim 3, wherein the electrical heating element comprises MoSi2 or FeCrAl based resistance heating elements.

5. The reactor configuration according to claim 1, wherein the reactor furnace comprises ten or more reactor tubes.

6. The reactor configuration according to claim 1, wherein the reactor furnace comprises at least two heating zones, wherein each heating zone has its own power control unit.

7. The reactor configuration according to claim 1, comprising at least ten electrically heated furnaces, each of which defines a space, and within each space at least ten reactor tubes, each of said reactor tubes having an exit and entrance outside of the reactor furnace, each of said furnaces further being provided with
   ten or more electrical radiative heating elements suitable for heating the reactor tubes to high temperatures in the range of 600 to 1100° C., arranged in at least four heating zones; and
   a number of inspection ports in the furnace wall such to be able to visually inspect the condition of the at least one reactor tube on each opposite side of said reactor tube during operation with the use of infrared radiant measurement techniques, the total number of inspection ports being sufficient to inspect all reactor tubes present in the furnace at their full length and circumference; and
   wherein the heating duty of each furnace is at least 3 MW.

8. The reactor configuration according to claim 1, being provided with a power supply connection to a renewable source for supplying at least part of the required power for the electrical heating.

9. A method of performing a gas conversion process at high temperatures, comprising
   introducing at least one gaseous reactant into a reactor configuration wherein the reactor configuration comprises
      at least one electrically heated furnace which defines a space, with at least one reactor tube placed within the furnace space and said reactor tube having an exit and entrance outside of the reactor furnace, and wherein said furnace is further provided with
      at least one electrical radiative heating element suitable for heating to high temperatures in the range of 400 to 1400° C., said heating element being located inside said furnace in such a way that the heating element is in no direct contact with the at least one reactor tube; and
      a number of inspection ports in the furnace wall such to be able to visually inspect the condition of the at least one reactor tube on all sides of said reactor tube during operation, the total number of inspection ports being sufficient to inspect all reactor tubes present in the furnace at their full length and circumference; and
      wherein the heating duty of the furnace is at least 3 MW;
   electrically heating at least one heating element to a temperature in the range of 400-1400° C., and
   performing the high temperature gas conversion while inspecting the reactor tube by means of sight on the reactor tube.

10. The method of claim 9, wherein the gas conversion process comprises producing a synthesis gas by means of steam methane reforming, dry CO2 reforming, reverse water-gas shift or a combination thereof, comprising the steps of:

i. Providing hydrocarbons and steam and/or $CO_2$ to the reactor configuration, such that the reaction mixture enters the at least one reactor tube;

ii. Maintaining the furnace of the reactor at a temperature of at least 400° C. by providing electrical energy to the at least one heating element;

iii. Allowing the hydrocarbons and steam to be converted into hydrogen and carbon monoxide; and iv. Obtaining from the reactor a synthesis gas stream.

11. The method of claim 9, comprising controlling the temperatures in different sections of the reactor furnace and wherein the reactor furnace comprises at least two heating zones, wherein each heating zone has its own power control unit that is regulated to achieve a heat flux profile over the surface of the at least one reactor tube.

12. The method of claim 9, further comprising supplying at least part of the power for the electrical heating from a renewable source.

* * * * *